United States Patent [19]

Satoyoshi et al.

[11] Patent Number: 4,765,563
[45] Date of Patent: * Aug. 23, 1988

[54] CASSETTE FOR ACCOMMODATING TAPE-SHAPED MATERIAL HAVING AN ELECTRICALLY CONDUCTIVE LAYER

[75] Inventors: Yasuhiko Satoyoshi; Keishi Kato, both of Kanagawa, Japan

[73] Assignee: Fuji Photo Film Co., Ltd., Kanagawa, Japan

[*] Notice: The portion of the term of this patent subsequent to Aug. 11, 2004 has been disclaimed.

[21] Appl. No.: 938,228

[22] Filed: Dec. 5, 1986

[30] Foreign Application Priority Data

Dec. 5, 1985 [JP] Japan ............................ 60-187548[U]

[51] Int. Cl.⁴ ..................... G03G 21/00; G11B 23/087
[52] U.S. Cl. ................................... 242/199; 355/3 BE
[58] Field of Search ............... 242/197, 198, 199, 200, 242/201, 71.2; 360/132; 355/3 BE, 16

[56] References Cited

U.S. PATENT DOCUMENTS

| | | | |
|---|---|---|---|
| 3,697,176 | 10/1972 | Kuehnle et al. | 355/45 |
| 3,928,214 | 12/1975 | Naka et al. | 585/9 X |
| 3,972,610 | 8/1976 | Gross | 355/10 X |
| 4,328,936 | 5/1982 | Bordignon | 242/199 |
| 4,345,284 | 8/1982 | Saito | 360/132 |
| 4,389,010 | 6/1983 | Oishi et al. | 242/76 X |
| 4,402,593 | 9/1983 | Bernard et al. | 355/3 BE |
| 4,449,676 | 5/1984 | Ogata et al. | 242/198 |
| 4,533,969 | 8/1985 | Miyashita et al. | 242/199 X |
| 4,572,649 | 2/1986 | Takahashi et al. | 355/16 X |
| 4,619,519 | 10/1986 | Takahashi et al. | 355/11 |
| 4,685,638 | 8/1987 | Satoyoshi et al. | 242/199 |

Primary Examiner—Stuart S. Levy
Assistant Examiner—Joseph J. Hail, III
Attorney, Agent, or Firm—Sughrue, Mion, Zinn, Macpeak & Seas

[57] ABSTRACT

A cassette for accommodating a tape-shaped material having an electrically conductive layer has a contact piece which is disposed on one end face of a take-up reel for winding up the material and which is electrically connected to an electrically conductive layer of the material. The cassette further has a reel retainer which has a grounding contact and which is secured to a cassette casing accommodating the material, the reel retainer being brought into contact with the contact piece. An electrically conductive grease is interposed in the area of contact between the contact piece and the reel retainer. Accordingly, the surfaces of the respective contact portions of the contact piece and the reel retainer are coated with the grease and thereby prevented from being oxidized. Even if dust is generated due to wear of the contact portions, it is trapped by the grease and thereby prevented from scattering.

10 Claims, 12 Drawing Sheets (A)

(B)

(C)

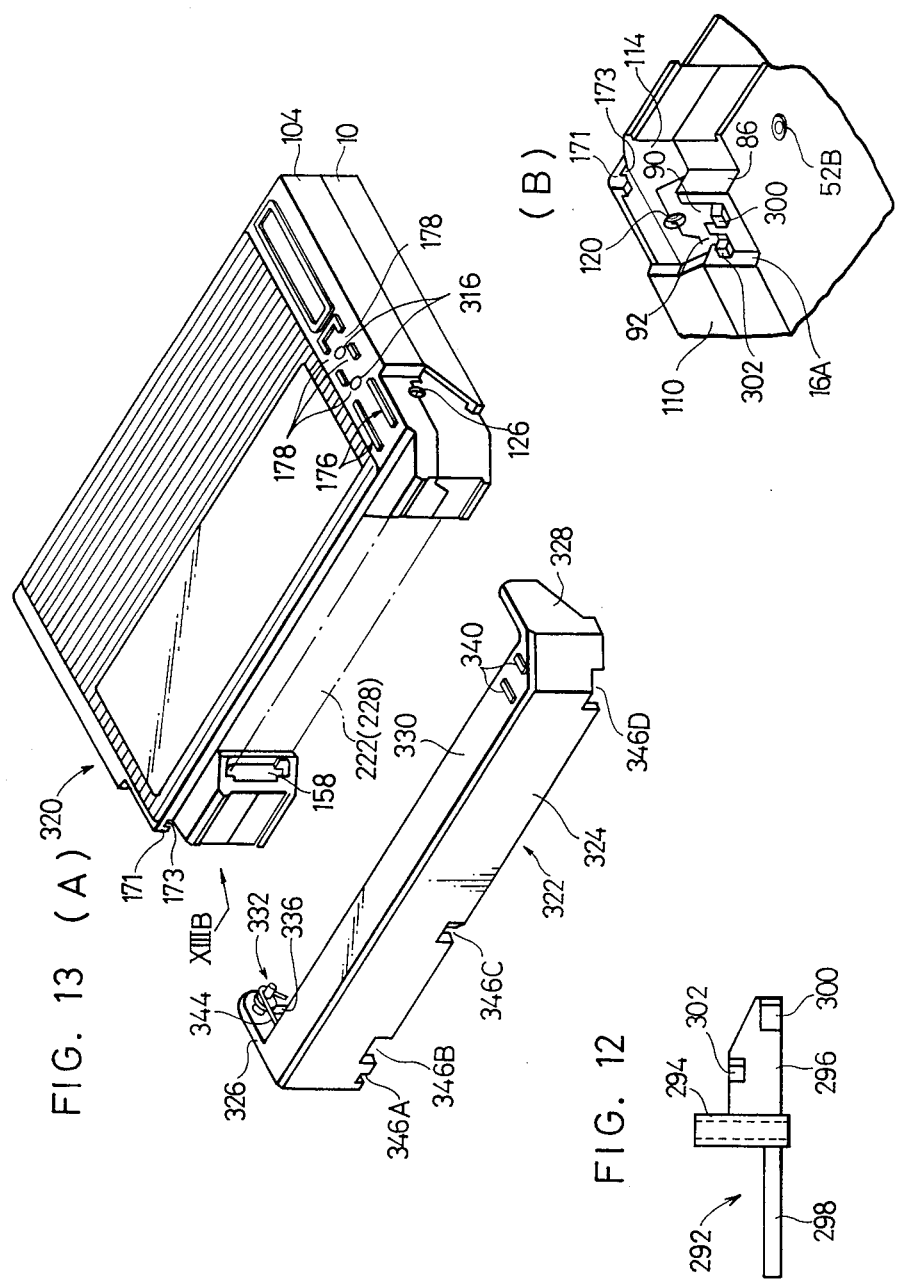

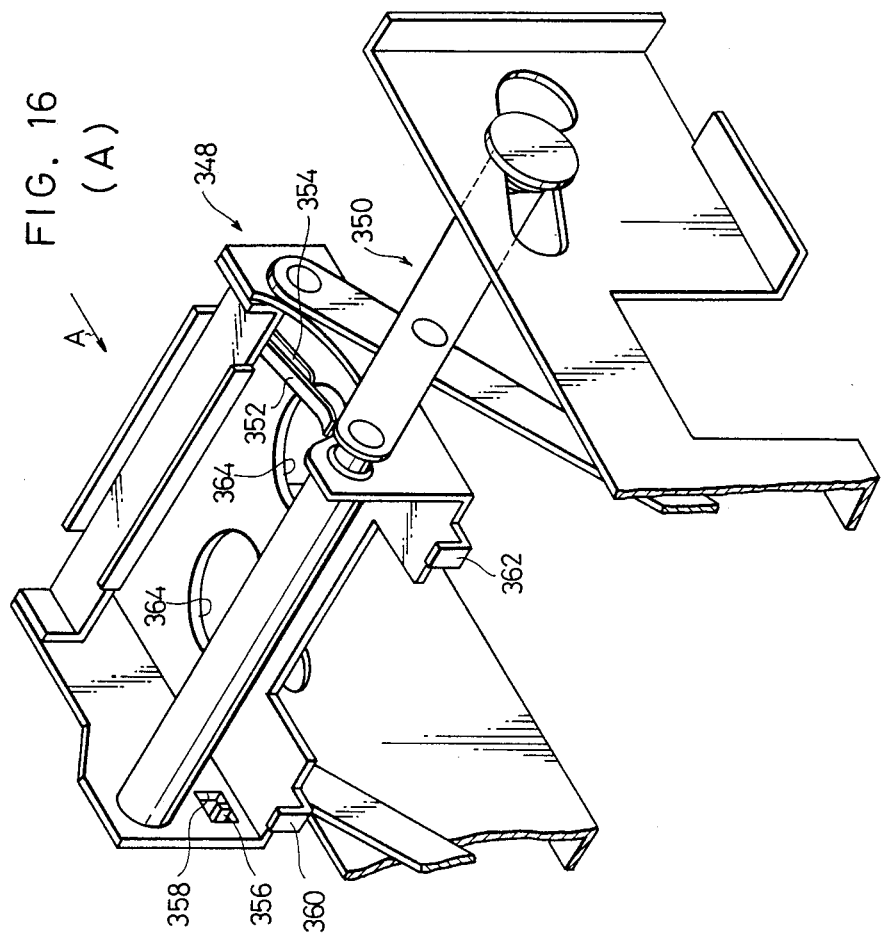

(B)

CASSETTE FOR ACCOMMODATING TAPE-SHAPED MATERIAL HAVING AN ELECTRICALLY CONDUCTIVE LAYER

BACKGROUND OF THE INVENTION

1. Field of the Invention

The present invention relates to a cassette for accommodating a tape-shaped material having an electrically conductive layer such as an electrophotographic film in which the tape-shaped material wound on a reel is accommodated in a cassette casing.

2. Description of the Related Art

Projecting and/or recording systems, which enable an image to be recorded on a predetermined frame of such a photosensitive film as the electrophotographic film and which also permit the recorded image to be projected or copied, have already been proposed in, e.g., U.S. Pat. Nos. 3,697,176 and 3,972,610 and U.S. patent application Ser. Nos. 632,222 now U.S. Pat. No. 4,619,519 and 920,336 filed Oct. 17, 1986 now U.S. Pat. No. 4,727,393.

For the purpose of keeping and handling the film applied to the apparatuses proposed in the above patents and applications, it is convenient to accommodate it in a cassette casing. However, when an image is recorded on a film having an electrically conductive layer, for example, an electrophotographic film, the electrically conductive layer must be grounded to release electric charge accommodated on an exposed portion of the film. Accordingly, a system where a reel on which the film is wound and a driving shaft driving the reel are electrically connected to each other is disclosed in U.S. Pat. No. 4,572,649. Also, a system where a leaf spring retaining the reel serves as a contact piece is disclosed in U.S. patent application Ser. No. 819,077 now U.S. Pat. No. 4,685,638. The grounding construction disclosed in the U.S. patent application Ser. No. 819,077 is as follows: The contact piece is secured to one end face of a take-up reel for winding the film to provide electrical connection between the contact piece and the electrically conductive layer, and a reel retainer which contacts the contact piece is secured to a cassette casing accommodating the electrophotographic film, the reel retainer being grounded.

When the film is advanced, the reel is rotated, and the contact piece is also rotated while being in contact with the reel retainer.

The following undesirable conditions can arise due to the conditions of use of the cassette.

During this rotation of the reel, heat is generated due to the friction occurring between the contact piece and the reel retainer, causing oxide film to be formed on the surfaces of the contact portions. In addition, dust is generated due to the wear of the contact piece and the reel retainer. Such oxide film and dust cause a contact failure and hence incomplete grounding, resulting in a problem such as fogging of the recorded image.

Further, the dust may be scattered to adhere to the electrophotographic film, so that the film may be flawed and images recorded thereon may be damaged by the dust during the repetition of winding and rewinding of the film.

SUMMARY OF THE INVENTION

In view of the above circumstances, the present invention is directed for improvement of the cassette, and it is a primary object of the present invention to provide a cassette for accommodating a tape-shaped material having an electrically conductive layer so designed that there is no risk of a contact failure occurring between the contact piece and the reel retainer and there is no fear of an image recorded on the film being damaged by the dust generated due to wear of the contact portions.

To this end, the present invention provides a cassette for accommodating a tape-shaped material having an electrically conductive layer, comprising: a cassette casing accommodating the tape-shaped material; a reel rotatably supported within the cassette casing for winding up the material; a contact piece disposed on one end face of the reel and electrically connected to an electrically conductive layer of the material; a reel retainer rigidly secured to the cassette casing and having a grounding contact, the reel retainer being in contact with the contact piece; and an electrically conductive grease interposed in the area of contact between the contact piece and the reel retainer.

By virtue of the presence of the electrically conductive grease, the surfaces of the contact portions of the contact piece and the reel retainer are coated with the grease and therefore not contacted by oxygen contained in the atmosphere, so that oxidation of the contact portions is prevented.

Accordingly, no contact failure occurs between the contact portions during rotation of the reel.

Further, the coating of the grease prevents friction from occurring between the contact portions, so that it is possible to suppress the generation of dust due to wear of the contact portions, and even if a very small amount of dust is generated, it is trapped by the electrically conductive grease and thereby prevented from scattering.

Accordingly, there is no fear of images recorded on the tape-shaped material being damaged.

BRIEF DESCRIPTION OF THE DRAWINGS

FIGS. 1 to 15 show in combination a cassette for accommodating an electrophotographic film in accordance with one embodiment of the present invention, in which:

FIG. 1 is an exploded perspective view of the whole of the cassette;

FIG. 2 shows the interior of the lower cassette casing;

FIG. 3 shows the interior of the upper cassette casing;

FIG. 4(A) is an exploded perspective view of one of the reels;

FIG. 4(B) is a perspective view of the reel shown in FIG. 4(A), as viewed from the underside thereof;

FIG. 4(C) is an enlarged perspective view of the clamp shown in FIG. 4(A);

FIG. 5 is an enlarged plan view of an essential portion of the reel;

FIG. 6 is a sectional view taken along the line VI—VI of FIG. 5;

FIG. 7 is a plan view of the lower cassette casing with various parts assembled therein;

FIG. 8 is a sectional view taken along the line VIII—VIII of FIG. 7;

FIG. 9(A) is an exploded perspective view of one of the guide rollers;

FIG. 9(B) is a plan view of the hub member of the guide roller shown in FIG. 9(A);

FIG. 9(C) is a sectional view taken along the line IXC—IXC of FIG. 9(B);

FIG. 10 is a perspective view of one of the brake levers;

FIG. 11(A) is a partially-cutaway perspective view of the release piece;

FIG. 11(B) is a sectional view of the release piece;

FIG. 11(C) is a perspective view of another example of the release piece;

FIG. 12 is a side view of the lock plate;

FIG. 13(A) is a perspective view of the cassette casing body and the guard panel before they are assembled together;

FIG. 13(B) shows a portion of the cassette casing body as viewed from the direction indicated by the arrow XIIIB in FIG. 13(A);

FIG. 14 is a perspective view of the guard panel as viewed from the underside thereof; and FIG. 15 is a perspective view of the cassette casing body and the guard panel in their assembled state;

DESCRIPTION OF THE PREFERRED EMBODIMENT

FIGS. 1 to 15 show in combination a cassette for accommodating an electrophotographic film in accordance with one embodiment of the present invention. This cassette will be described below in detail for each of the constituent elements thereof.

Lower Cassette Casing

Figure 1:
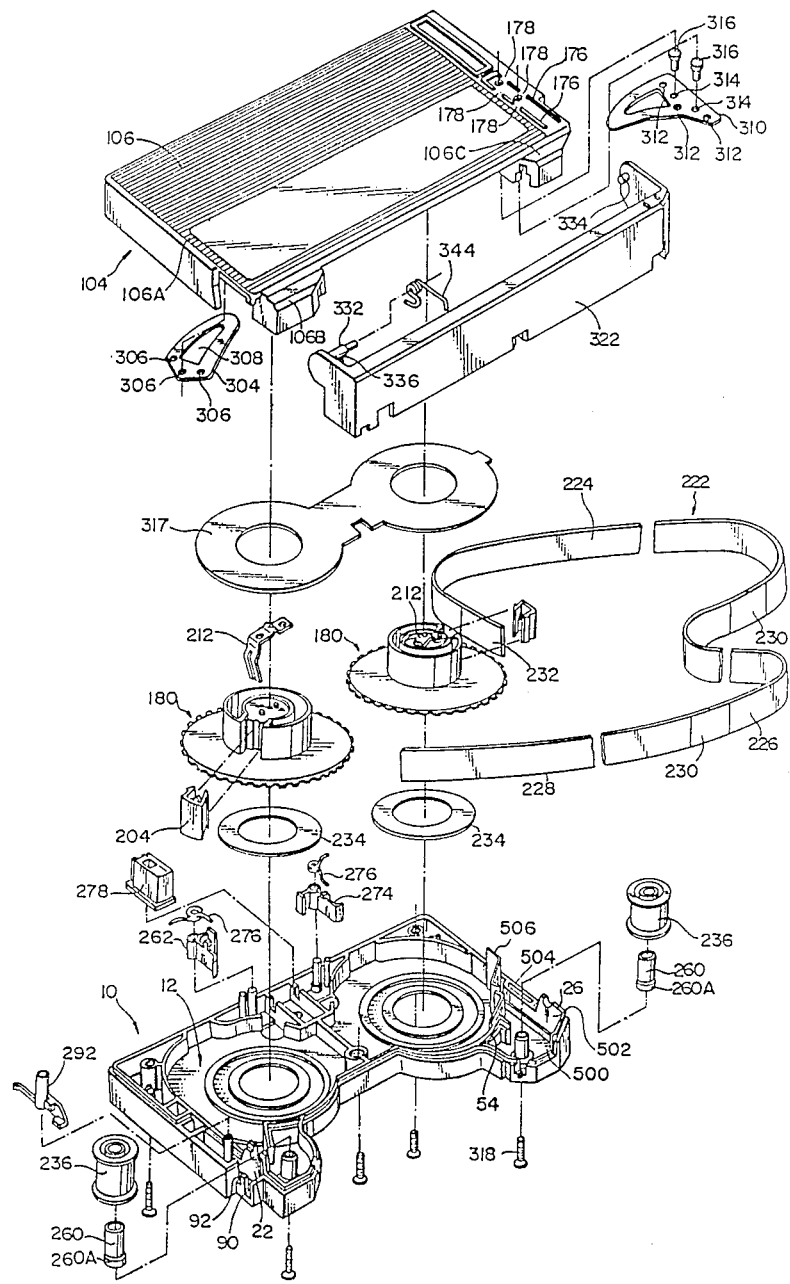
Figure 2:
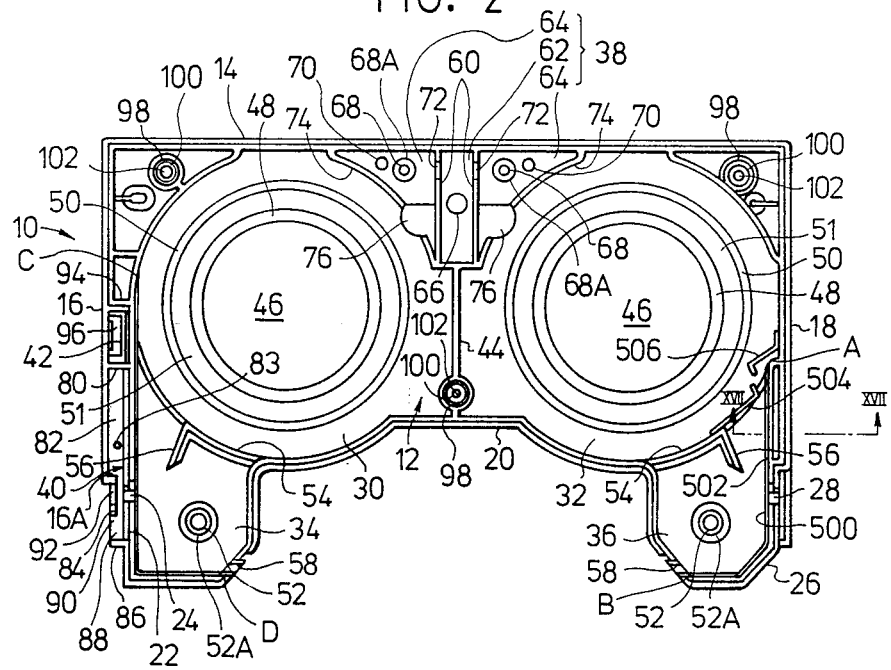

As shown in FIGS. 1 and 2, a lower cassette casing 10 includes a substantially U-shaped bottom panel 12 having its right and left front end portions projecting forwardly. The bottom panel 12 has peripheral walls projecting upwardly from the periphery and the inner surface thereof. The peripheral walls consist of a rear wall 14 standing from the rear edge of the bottom panel 12, left and right side walls 16, 18 respectively standing from the left and right side edges of the panel 12, and a front wall 20 which extends over from the front edge portion of the panel 12 toward the left and right side edges. The rear wall 14 and the side walls 16, 18 are integrated together to provide a U-shaped peripheral wall portion extending along the outermost periphery of the bottom panel 12.

The front wall 20 is disposed such that a portion thereof which is provided at the front edge of the bottom panel 12 is positioned at the outermost periphery of the panel 12, while portions of the front wall 20 which are provided at the left end portions of the bottom panel 12 are positioned on the inner sides of the walls 16, 18, respectively. The portion of the front wall 20 positioned on the inner side of the left side wall 16 extends rearwardly in parallel with the wall 16 and then curves inwardly so as to be contiguous with the rear wall 14. The portion of the front wall 20 positioned on the inner side of the right side wall 18 extends rearwardly in parallel with the wall 18 with a slight spacing therebetween and then curves outwardly so as to be contiguous with the wall 18.

A portion of that part of the front wall 20 which extends parallel to the left side wall 16 projects upwardly beyond the other portion of said part so as to provide a projecting wall 22. A recess 24 having a semicircular cross-section is formed in the upper end surface of the projecting wall 22. A portion of the front wall 20 which extends over from the portion parallel to the right side wall 18 to the front edge-side portion of the wall 20 projects upwardly beyond the other portion of the front wall 20 in this section, thus providing a projecting wall 26. A recess 28 having a semicircular cross-section is formed in the upper end surface of the portion of the projecting wall 26 which extends parallel to the right side wall 18.

In the lower cassette casing 10, partition walls, columnar and cylindrical projections, recesses and protuberances are formed on the inner surface of the bottom panel 12 and on the inner side of the above peripheral walls, as described later. All of these portions are formed on the lower cassette casing 10 by integral molding from a synthetic resin.

The inside of the lower cassette casing 10 is partitioned by partition walls so as to define various chambers, that is, left and right reel chambers 30, 32 for accommodating a pair of reels, left and right guide roller chambers 34, 36 for accommodating a pair of guide rollers, a brake mechanism chamber 38 for accommodating a brake mechanism for the reels, a lock plate chamber 40 for accommodating a lock plate which locks a guard panel, and an independent chamber 42 in which a tab is disposed.

The left and right reel chambers 30 and 32 are respectively positioned on the left and right sides of a central partition wall 44 which is provided such as to project upwardly from the bottom panel 12 and at a position which is slightly closer to the right end of the lower cassette casing 10 than the lateral center thereof. Circular through-holes 46 are provided in the bottom panel 12 and at the respective centers of the left and right reel chambers 30 and 32. An annular protuberance 48 having a rectangular cross-section is formed on the inner surface of the bottom panel 12 and along the peripheral edge of each of the through-holes 46. An annular protuberance 50 having a rectangular cross-section is concentrically formed around each annular protuberance 48. The portion of the bottom panel 12 between each pair of annular protuberances 48 and 50 is slightly recessed from the surface of the panel 12, thus providing an annular recess 51. The edge of each through-hole 46 on the outer surface of the bottom panel 12 is chamfered to a substantial extent (see FIG. 8).

The left and right guide roller chambers 34 and 36 are respectiviely positioned in the left and right projecting portions at the front end of the lower cassette casing 10 so that the chambers 34 and 36 are respectively adjacent to the left and right reel chambers 30 and 32. A cylindrical projection 52 is formed on the bottom panel 12 such as to project from the center of each of the left and right guide roller chambers 34 and 36 as far as the upper ends of the peripheral walls. A flange 52A is formed at the root portion of each of the projections 52. A recess 52B [see FIG. 13(B)] which has an inside diameter larger than the inside diameter of the hollow portion of the cylindrical projection 52 is formed in the outer surface of the bottom panel 12 at the portion thereof which is formed with the flange 52A. The hollow portion of the projection 52 opens into the recess 52B so as to communicate with the outside.

The left and right guide roller chambers 34, 36 and the left and right reel chambers 30, 32 are respectively partitioned by partition walls 54. The distal end portion of each wall 54 is bent so as to provide an opening and define a partition wall 56 which extends into the guide roller chamber 34 (or 36). Further, notches 58 are formed in two portions of the front wall 20 which respectively face the left and right guide roller chambers 34 and 36, thereby allowing the chambers 34 and 36 to communicate with the outside.

The brake mechanism chamber 38 is positioned in the center of the rear end portion of the lower cassette casing 10 adjacent to the left and right reel chambers 30 and 32. The chamber 38 is further partitioned into three chambers by the central partition wall 44 and two partition walls 60 which extend parallel to the prolongation of the wall 44, the central chamber serving as a release piece chamber 62, and the left and right chambers serving as brake lever chambers 64, respectively.

The release piece chamber 62 has a circular through-hole 66 provided in the bottom panel 12 and at the center of the chamber 62. The peripheral edge of the through-hole 66 on the outer surface of the bottom panel 12 is chamfered. Two columnar projections 68 and 70 are provided in each of the brake lever chambers 64 so as to project from the bottom panel 12 beyond the upper ends of the peripheral walls, the projections 68 and 70 being disposed adjacent to each other laterally of the lower cassette casing 10. Flanges 68A are respectively formed at the root portions of the inner columnar projections 68.

Notches 72 are partially formed in the partition walls 60, respectively, which partition the brake mechanism chamber 38 into the release piece chamber 62 and the left and right brake lever chambers 64, thereby allowing the chambers to communicate with each other. The left and right brake lever chambers 64 and the left and right reel chambers 30, 32 are respectively partitioned by partition walls 74 which are partially opened so that each pair of adjacent chambers communicate with each other. Recesses 76 are formed in the bottom panel 12 near the opened portions of the walls 74 such as to extend over the chambers 64 and the chambers 30, 32, respectively.

The lock plate chamber 40 is positioned in the left-hand side portion at the front end of the lower cassette casing 10. The chamber 40 has a rear chamber portion 82 which is laterally defined by the left side wall 16 and that portion of the front wall 20 which is positioned on the inner side of the wall 16, the rear end of the portion 82 being defined by a partition wall 80 both ends of which are contiguous with the walls 16 and 20. A columnar projection 83 is provided in the rear chamber portion 82 so as to project from the bottom panel 12 beyond the upper ends of the peripheral walls.

The lock plate chamber 40 further has a front chamber portion 88 which is laterally defined by a lock plate retaining wall 84 contiguously extending from the inwardly bent front end 16A of the left side wall 16 and that portion of the front wall 20 positioned on the inner side of the wall 16, the front end of the portion 88 being defined by a front wall portion 86 extending leftwardly from said portion of the front wall 20. The lock plate retaining wall 84 is not contiguous with the front wall portion 86, and an opening 90 is provided between the wall 84 and the wall portion 86. Further, a notch 92 is formed in the lock plate retaining wall 84.

The independent chamber 42 is positioned adjacent to the rear end of the lock plate chamber 40. The independent chamber 42 is laterally defined by the left side wall 16 and that portion of the front wall 20 positioned on the inner side of the wall 16, and the front end of the chamber 42 is defined by the partition wall 80, while the rear end thereof is defined by a partition wall 94. The portion of the bottom panel 12 which constitutes the bottom of the independent chamber 42 is partially cut off from the body of the panel 12 so that it is contiguous with the body at a few (two) portions thereof, the partially cut portion of the panel 12 serving as a tab 96. When the tab 96 is pressed by a finger or the like, the tab 96 can readily be broken at its joint with the body of the bottom panel 12 and separated from the lower cassette casing 10.

Three cylindrical projections 98 are respectively provided in the left and right corners at the rear end of the lower cassette casing 10 and at the center of the front end thereof so that they project from the inner surface of the bottom panel 12 as far as the upper ends of the peripheral walls. The hollow portion of each of the projections 98 also opens to the outer surface of the bottom panel 12. A partition wall 100 is formed in the hollow portion of each projection 98 and at a position slightly lower than the distal or upper end thereof so that the hollow portion is divided into upper and lower portions. A circular through-hole 102 is provided in the center of the partition wall 100, whereby the upper and lower hollow portions are communicated with each other through the through-hole 102. The head of a tapping screw 318 (described later) abuts against the partition wall 100 so as to be retained thereby.

The greater part of the peripheral walls of the lower cassette casing 10, the partition walls 54 between the left and right reel chambers 30, 32 and the left and right guide roller chambers 34, 36, and the partition walls 56 and 94 which are contiguous with the walls 54 are so shaped that substantially a half of the upper end surface of each of these walls slightly projects from the other surface portion in the form of a step for the purpose of connecting the lower cassette casing 10 and an upper cassette casing 104 (described later) by means of spigot joint.

Figure 3:
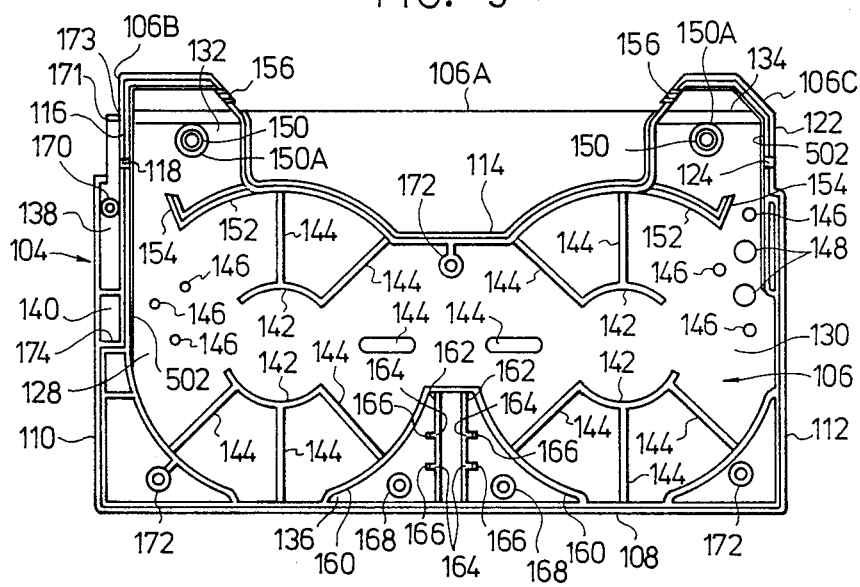

Upper Cassette Casing:

As shown in FIGS. 1 and 3, the upper cassette casing 104 includes a top panel 106 which is constituted by a rectangular body portion 106A, together with left and right end portions 106B and 106C which project from the body portion 106A slightly forwardly (these portions 106B and 106C are located on the upper side of the body portion 106A in FIG. 3, since the upper cassette casing 104 is drawn upside down in FIG. 3). Peripheral walls project downwardly from the periphery and the inner surface of the top panel 106. The left and right end portions 106B and 106C of the top panel 106 are disposed such as to be different in level from the body portion 106A, that is, they are positioned lower than the body portion 106A as viewed in FIG. 1. The peripheral walls consist of a rear wall 108, left and right side walls 110, 112 and a front wall 114, which are so shaped that they respectively correspond to and abut against the rear wall 14, the left and right side walls 16, 18 and the front wall 20 provided on the lower cassette casing 10.

A portion of that part of the front wall 114 which extends parallel to the left side wall 110 is recessed so as to provide a recessed wall 116. A recess 118 having a semicircular cross-section is formed in the lower end surface (the upper end surface, in the case where the upper cassette casing 104 is placed upside down, as shown in FIG. 3) of the wall 116. The recessed wall 116 is so shaped that it receives the projecting wall 22 formed on the front wall 20 of the lower cassette casing 10, and when the projecting wall 22 is fitted into the recessed wall 116, a shaft supporting bore 120 having a circular cross-section is defined by the recess 118 and the recess 24 which is formed in the projecting wall 22, the recesses 118 and 24 facing each other [see FIG. 13(B)].

A portion of the front wall 114 which extends over from the portion parallel to the right side wall 112 to the front edge-side portion of the wall 114 is recessed so as to provide a recessed wall 112. A recess 124 having a semicircular cross-section is formed in the lower end surface of the recessed wall 122. The wall 122 is so shaped that it receives the projecting wall 26 formed on the front wall 20 of the lower cassette casing 10, and when the projecting wall 26 is fitted into the recessed wall 122, a shaft supporting bore 126 having a circular cross-section is defined between the recess 124 and the recess 28 which is formed in the projecting wall 26, the recesses 124 and 28 facing each other [see FIG. 13(A)].

The inside of the upper cassette casing 104 is partitioned by partition walls such as to define upper chambers which respectively correspond to those formed in the lower cassette casing 10, that is, left and right reel chambers 128, 130, left and right guide roller chambers 132, 134, a brake mechanism chamber 136, a lock plate chamber 138, and an independent chamber 140.

Unlike the left and right reel chambers 30 and 32 formed in the lower cassette casing 10, the left and right reel chambers 128 and 130 have no partition wall therebetween and therefore are communicated with each other. Circular ribs 142 and radially extending linear ribs 144 are formed within each of the chambers 128 and 130 such as to project from the top panel 106 for the purpose of reinforcing the panel 106.

Three columnar relatively short projections 146 are formed within each of the reel chambers 128 and 130 such as to project from the top panel 106, the projections 146 within the chamber 128 being located on the side thereof which is closer to the left end of the casing 104, and the projections 146 within the chamber 130 being located on the side thereof which is closer to the right end of the casing 104 asymmetrically with the former projections 146 with respect to the longitudinal axis of the casing 104. Further, only the right reel chamber 130 has two through-holes 148 with a circuler cross-section formed in series longitudinally of the casing 104 in the right end portion of the chamber 130.

A cylindrical projection 150 is formed at the center of each of the left and right guide roller chambers 132 and 134 so as to project from the top panel 106 as far as the vicinity of the distal ends of the peripheral walls. A flange 150A is formed at the root portion of each of the projections 150. When the upper cassette casing 104 is connected to the lower cassette casing 10, these cylindrical projections 150 are positioned directly above the cylindrical projections 52 respectively formed within the left and right guide roller chambers 34 and 36 of the lower cassette casing 10. In this case, the respective ends of each pair of corresponding projections 150 and 52 abut against each other. It is to be noted that the hollow portion of each projection 150 has a slightly smaller inside diameter than that of the hollow portion of each projection 52, and the proximal end of each projection 150 is closed and therefore not communicated with the outside.

The left and right guide roller chambers 132, 134 and the left and right reel chambers 128, 130 are respectively partitioned by partition walls 152. The distal end portion of each wall 152 is bent so as to provide an opening and define a partition wall 154 which extends into the guide roller chamber 132 (or 134) in a manner similar to that in the case of the lower cassette casing 10. Further, notches 156 are similarly formed in two portions of the front wall 114 which respectively face the left and right guide roller chambers 132 and 134, thereby allowing the chambers 132 and 134 to communicate with the outside. When the upper cassette casing 104 is connected to the lower cassette casing 10, the notches 156 respectively face the notches 58 formed in the front wall 20 of the casing 10, thereby defining tape inlet/outlet ports 158 having a rectangular cross section [see FIG. 13(A)].

Unlike the brake mechanism chamber 38 of the lower cassette casing 10, the inside of the brake mechanism chamber 136 is not partitioned into three chambers. Further, no opening is formed in partition walls 160 which partition the chamber 136 from the left and right reel chambers 128 and 130. Two parallel guide walls 162 having a relatively low height are provided in the center of the brake mechanism chamber 136 so as to extend longitudinally of the upper cassette casing 104. Two guide walls 164 slightly project from the outer surface of each of the guide walls 162 laterally of the casing 104, the guide walls 164 having the same height as that of the guide walls 162. A step-like projecting portion 166 is formed at the distal end of each of the guide walls 164.

Two cylindrical projections 168 are respectively formed at left and right positions in the rear portion of the brake mechanism chamber 136 such a to project from the top panel 106 as far as the vicinity of the distal ends of the peripheral walls. When the upper cassette casing 104 is connected to the lower cassette casing 10, the projections 68 formed in the brake mechanism chamber 38 of the casing 10 are respectively fitted into the inner hollow portions of the projections 168.

The lock plate chamber 138 has a cylindrical projection 170 projecting from the top panel 106 as far as the vinicity of the distal ends of the peripheral walls. When the upper cassette casing 104 is connected to the lower cassette casing 10, the columnar projection 83 formed in the lock plate chamber 40 of the casing 10 is fitted into the inner hollow portion of the cylindrical projection 170. Unlike the independent chamber 42 of the lower cassette casing 10, the independent chamber 140 has no tab formed on a portion of the panel 106 which constitutes the bottom of the chamber 140. The chamber 140 is formed in the shape of a parallelepiped only one side of which is open.

A projection 171 projects from the left corner at the front end of the top panel 106 of the upper cassette casing 104. A recess 173 is defined between the projection 171 and that portion of the front wall 114 which extends parallel to the left side wall 110 [see FIG. 13(B) in combination with FIG. 3].

Three cylindrical projections 172 are respectively formed at the left and right corners at the rear end portion and at the center of the front end portion of the upper cassette casing 104 such as to project from the inner surface of the top panel 106 beyond the distal ends of the peripheral walls. It is to be noted that the hollow portion of each of the cylindrical projections 172 is closed at the proximal end thereof and therefore not communicated with the outside.

The greater part of the peripheral walls of the upper cassette casing 104, the partition walls 152 between the left and right reel chambers 128, 130 and the left and right guide roller chambers 132, 134, and the partition walls 154 which are contiguous with the walls 152 are so shaped that substantially a half of the distal end surface of each of these walls slightly projects from the other surface portion in the form of a step for the purpose of connecting the upper cassette casing 104 and the lower cassette 10 by means of spigot joint. A partition wall 174 which defines the rear end of the independent chamber 140 is made flush with the above-described surface portion, which projects in the form of a step, whereby the wall 174 and the partition wall 94 of the independent chamber 42 of the lower cassette casing 10 are connected together by means of spigot joint.

A group of ridges are formed on the outer surface of the top panel 106 of the upper cassette casing 104 so that they define guide rails 176 arranged in a substantially U-shaped configuration as a whole such as to surround the through-holes 148 formed in the right reel chamber 130, as shown in FIG. 1. The degree by which the ridges (rails) 176 project from the outer surface of the top panel 106 is very small. Four recesses 178 are respectively defined between pairs of adjacent ridges 176. Two of the four recesses 178 which are positioned on one side of the substantially U-shaped guide rail, constituted by the ridges 176, are respectively offset from the other two recesses 178 which are positioned on the other side of the rail as viewed in the longitudinal direction of the upper cassette casing 104 so that each of the through-holes 148 is positioned between the two sides of the rail and on the imaginary diagonal line connecting the diagonally facing recesses 178 as viewed in the lateral direction of the casing 104.

All the portions of the upper cassette casing 104 are integrally molded from a synthetic resin in a manner similar to that in the case of the lower cassette casing 10.

Figure 4:
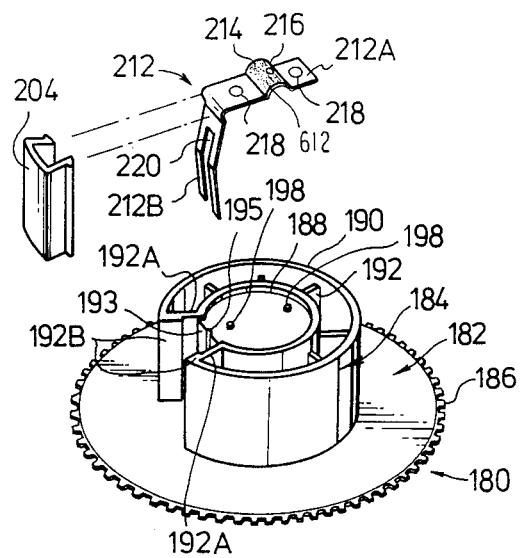
Figure 4:
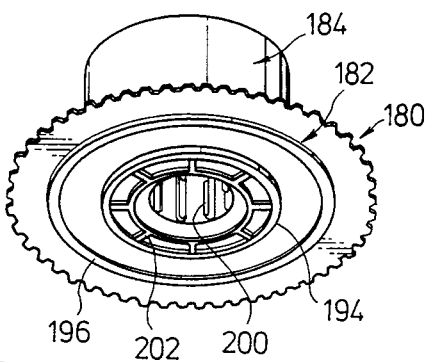
Figure 4:
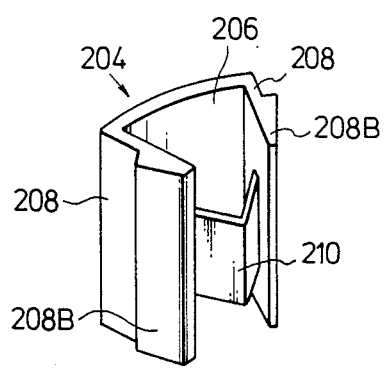

Reel:

Referring to FIGS. 1 and 4, each of the reels 180 consists of a flange 182 and a hub 184 which are integrally molded from a synthetic resin. A multiplicity of rectangular teeth 186 are formed along the outer peripheral surface of the flange 182 at equal spacings. The hub 184 is constituted by a cylindrical inner tube 188 and a cylindrical outer tube 190 which are connected by eight ribs 192 radially extending from the inner tube 188. The lower side of the inner tube 188 is open, while the upper side of the outer tube 190 is open, and the other sides of the tubes 188 and 190 are closed.

An annular protuberance 194 having a rectangular cross-section is formed on the lower side of the flange 182 such as to be concentrical with the flange 182. The outside diameter of the annular protuberance 194 is so set that the protuberance 194 is movably fitted into the corresponding through-hole 46 formed in the lower cassette casing 10. Another annular protuberance 196 having a rectangular cross-section is concentrically formed around the annular protuberance 194.

About an eighth part of the outer tube 190 of the hub 184 is cut off to provide a recess. Two of the ribs 192 which extend radially from the inner tube 188 are respectively contiguous with the two end faces of this recess. These two ribs are denoted by a reference numeral 192A in order to distinguish them from the other ribs. Each of the ribs 192A extends upwardly so that the upper end thereof is higher than the upper ends of the other ribs 192 and is flush with the upper end surface of the outer tube 190. Further, step portions 192B are formed on respective portions of the ribs 192A which are contiguous with the outer tube 190, the portions 192B projecting toward each other.

Figure 5:
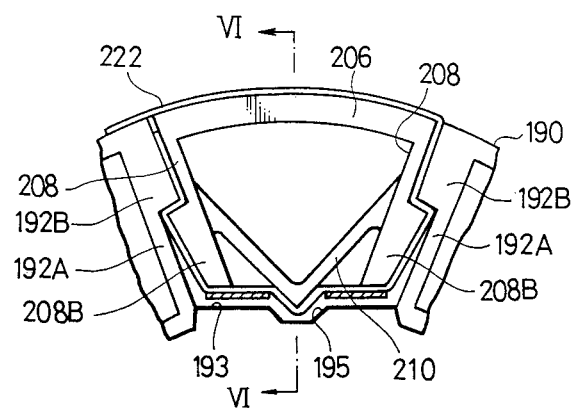

A portion of the outer peripheral surface of the inner tube 188 which faces the recess of the outer tube 190 is flattened so as to provide a flat-wall surface 193 (see FIG. 5 in combination with FIG. 4). A groove 195 is formed in the circumferential center of the flat-wall surface 193, the groove 195 extending vertically.

Two columnar relatively short projections 198 are formed on the upper surface of the inner tube 188 so that the projections 198 are positioned on the same imaginary diametrical line of the inner tube 188 which passes through the groove 195 formed in the flat-wall surface 193. Nine projections 200 are formed in the hollow portion of the inner tube 188 at equal spacings such as to project from the inner surface toward the center thereof. These projections 200 have a trapezoidal cross-section and extend in the heightwise direction of the inner tube 188.

Figure 6:
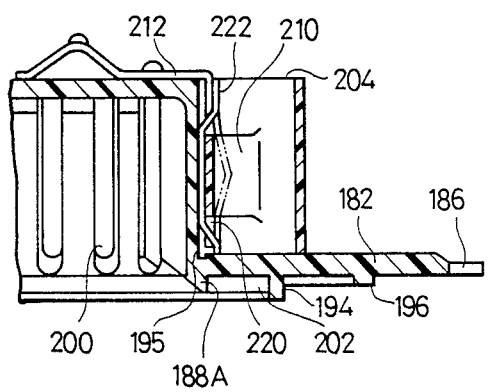

As shown in FIG. 6, the lower end 188A of the inner tube 188 projects beyond the undersurface of the flange 182. Ribs 202 are formed such as to connect the projecting end portion of the inner tube 188 and the annular protuberance 194 formed on the flange 182.

A clamp 204 is disposed in the recess formed in the outer tube 190 of the hub 184, whereby one end portion of a tape 222 is retained on the reel 180.

Clamp:

As shown in FIGS. 1 and 4(C), the clamp 204 comprises; a base portion 206 the outer periphery of which has a curvature substantially equal to that of the outer periphery of the outer tube 190 of the hub 184; leg plate portions 208 respectively extending from both ends of the base portion 206 toward the center of the curvature of the outer periphery of the base portion 206; and a bent plate portion 210 having both ends thereof respectively connected to the leg plate portions 208, the portion 210 having a V-shaped cross-section. A step portion 208B projects from the outer surface of the distal end portion of each of the leg plate portions 208. The above portions of the clamp 204 are integrally molded from a synthetic resin.

The clamp 204 is disposed in the recess formed in the hub outer tube 190 of each of the reels 180 as described above. At that time, a contact piece 212 is simultaneously disposed in the recess.

Contact Pieces:

Referring to FIGS. 1 and 4, the contact piece 212 for grounding is constituted by a single flat metal sheet formed by bending, embossing and shearing. The contact piece 212 is bent at right angles at its approximately central portion. The approximately central portion of one side portion 212A of the bent contact piece 212 is subjected to bending so as to provide a protuberant surface 214 having a semicircular cross-section, the surface 214 projecting outwardly. The center of the top of the protuberant surface 214 is embossed so as to provide a hemispheric convex portion 216 projecting outwardly. Bores 218 are formed in the contact piece 212 by shearing, the bores 218 being respectively located on both sides of the protuberant surface 214 in the longitudinal direction of the contact piece 212.

A rectangular notch 220 is formed in the other side portion 212B of the bent contact piece 212 by shearing. The notch 220 communicates with the outside at one end thereof in the longitudinal direction of the contact piece 212. The side portion 212B is slightly bent outwardly at a position near the approximately central portion of the contact piece 212 at which it is bent at right angles. The side portion 212 is further slightly bent inwardly at its approximately central portion.

Tape:

As shown in FIG. 1, the tape 222 which is to be accommodated in the cassette casing body consists of an electrophotographic film 224, a magnetic tape 226 which serves as a memory tape, and a leader tape 228, which are spliced together by pieces of splicing tape 230. An electrically conductive adhesive tape 232 is bonded to the end of the electrophotographic film 224 opposite to the end thereof which is spliced to the magnetic tape 226 by the splicing tape 230.

The electrophotographic film 224 is in the shape of a tape which is formed from a transparent insulating base of, e.g., polyester, together with an electrically conductive layer of, e.g., Al, Au, $In_2O_3$, ZnO, or CuI and a photoconductive insulating layer of, e.g., polyvinyl carbazole, which is an organic semiconductor, these layers being, in that order, coated on the base.

It is to be noted that the electrically conductive layer can be formed by evaporating the above metal material on the base or by applying a binder containing the particles or powder of the above metal material to the base. Also, electrophotographic film which can be applied to the present invention is not limited to the example of the above embodiment, but well-known electrophotographic films can be applied to the present invention. The electrically conductive adhesive tape 232 is constituted by a thin metallic tape provided thereon with an adhesive layer having electrically conductive particles, such as, carbon dispersed and compounded therein.

When the electrically conductive adhesive tape 232 is bonded to the electrophotographic film 224, the photoconductive insulating layer of the electrophotographic film 224 is partially peeled, and the adhesive tape 232 is bonded to the exposed electrically conductive layer.

Retaining of Tape on Reel:

The tape 222 is retained on the reel 180 in the manner described below.

The contact piece 212 is first disposed on the hub 184 of the reel 180. The contact piece 212 is engaged with the hub 184 in such a manner that the projections 198 formed on the upper surface of the inner tube 188 of the hub 184 are respectively fitted into the bores 218 formed on one side portion 212A of the contact piece 212. Since the diameter of the bores 218 and that of the projections 198 are so set that they are tight-fitted to each other, it suffices to employ tight-fitting alone. However, it is possible to reliably prevent the contact piece 212 from coming out of the hub 184 by thermally caulking the respective distal end portions of the projections 198 after they have been fitted into the bores 218.

Since one side portion 212A of the contact piece 212 is positioned in the manner described above, the other side portion 212B is positioned so as to extend along the flat-wall surface 193 formed on the outer peripheral surface of the inner tube 188. In consequence, the upper end portion of the side portion 212B comes in plane contact with the flat-wall surface 193, while the lower end of the side portions 212B comes in point contact with the flat-wall surface 193.

Then, as shown in FIG. 5. the clamp 204 having one end portion of the tape 222 wound thereon is press-fitted into the recess formed in the outer tube 190 of the hub 184. The distal end portion of the electrophotographic film 224 is retained on the reel 180 which is accommodated in the right reel chamber, and the distal end portion of the leader tape 228 is retained on the reel 180 which is accommodated in the left reel chamber. It is to be noted that the electrophotographic film 224 is wound around the clamp 204 in such a manner that the electrically conductive adhesive tape 232 is outward.

The step portions 208B of the clamp 204 are respectively retained by the step portions 192B formed on the ribs 192A, whereby the clamp 204 is prevented from coming out of the recess in the radial direction of the reel 180. Further, as shown in FIG. 6, the central bent portion of the bent plate portion 210 enters the notch 220 formed in the contact piece 212 and projects from the rear side of the contact piece 212 so that the upward movement of the bent plate portion 210 is limited by the upper end face of the notch 220, thus preventing the clamp 204 from coming out of the recess in the upward direction. It is to be noted that the distal end of the central bent portion of the bent plate portion 120 is positioned within the groove 195 formed in the flat-wall surface 193. The clamp 204 is further press-fitted into the recess, so that the leg plate portions 208 are deflected inwardly about their joints with the base portion 206 and, at the same time, the bent plate portion 210 is also deflected. Therefore, the leg plate portions 208 are respectively pressed against the step portions 192B by means of the shape restoring force. Accordingly, the clamp 204 is disposed on the hub 184 without any backlash or play.

The tape 222 is pressed and clamped between the leg plate portion 208 of the clamp 204 and the ribs 192A and is further bent by a multiplicity of angular portions as well as being supported in such a manner that the tape 222 is forced into the notch 220 of the contact piece 212 by the central bent portion of the bent plate portion 210. Thus, the tape 222 is reliably retained on the reel 180.

Since the tape 222 is forced into the notch 220, the electrically conductive adhesive tape 232 is reliably pressed against the contact piece 212, whereby a reliable electrical connection is obtained between them.

Thus, the reels 180 having the tape 222 retained thereon are respectively accommodated in the left and right reel chambers 30 and 32 of the lower cassette casing 10.

Figure 7:
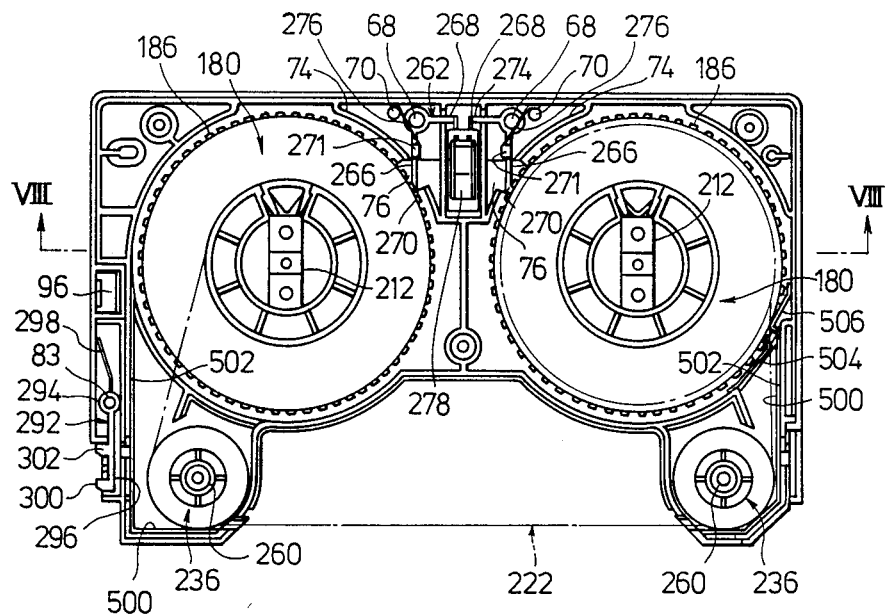
Figure 8:
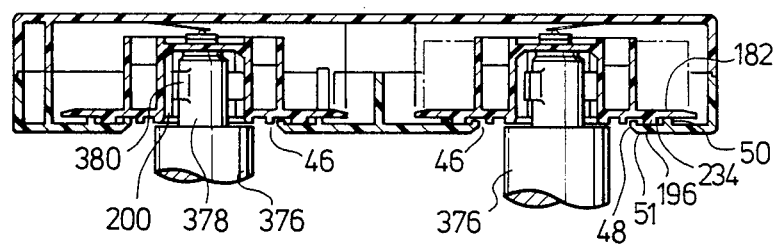

Position of Reel in Lower Cassette Casing:

As shown in FIGS. 7 and 8, the reels 180 are respectively disposed in the left and right reel chambers 30 and 32 of the lower cassette casing 10 in such a manner that the annular protuberance 194 formed on the undersurface of the flange 182 of each reel 180 is fitted into the through-hole 46 formed in each of the chambers 30 and 32. Prior to this fitting, a slide sheet 234 (see FIG. 1) made of a material having a relatively small surface friction coefficient, such as Teflon, is laid within each of the annular recess 51, the slide sheet 234 having an outside diameter smaller than the inside diameter of the annular protuberance 50. Thus, the reels 180 are respectively accommodated in the reel chambers 30 and 32, and the annular protuberance 196 formed on the undersurface of the flange 182 of each reel 180 is positioned so as to abut against the slide sheet 234 laid on the annular recess 51, as shown in FIG. 8.

In this state, the depth of each annular recess 51 is reduced by an amount corresponding to the thickness of the slide sheet 234. Consequently, the annular protuberances 48 and 50 formed in each of the reel chambers 30 and 32 are not in contact with the undersurface of the flange 182.

The intermediate portion of the tape 222 having both its ends respectively retained on the reels 180 is passed over left and right guide rollers 236.

Figure 9:
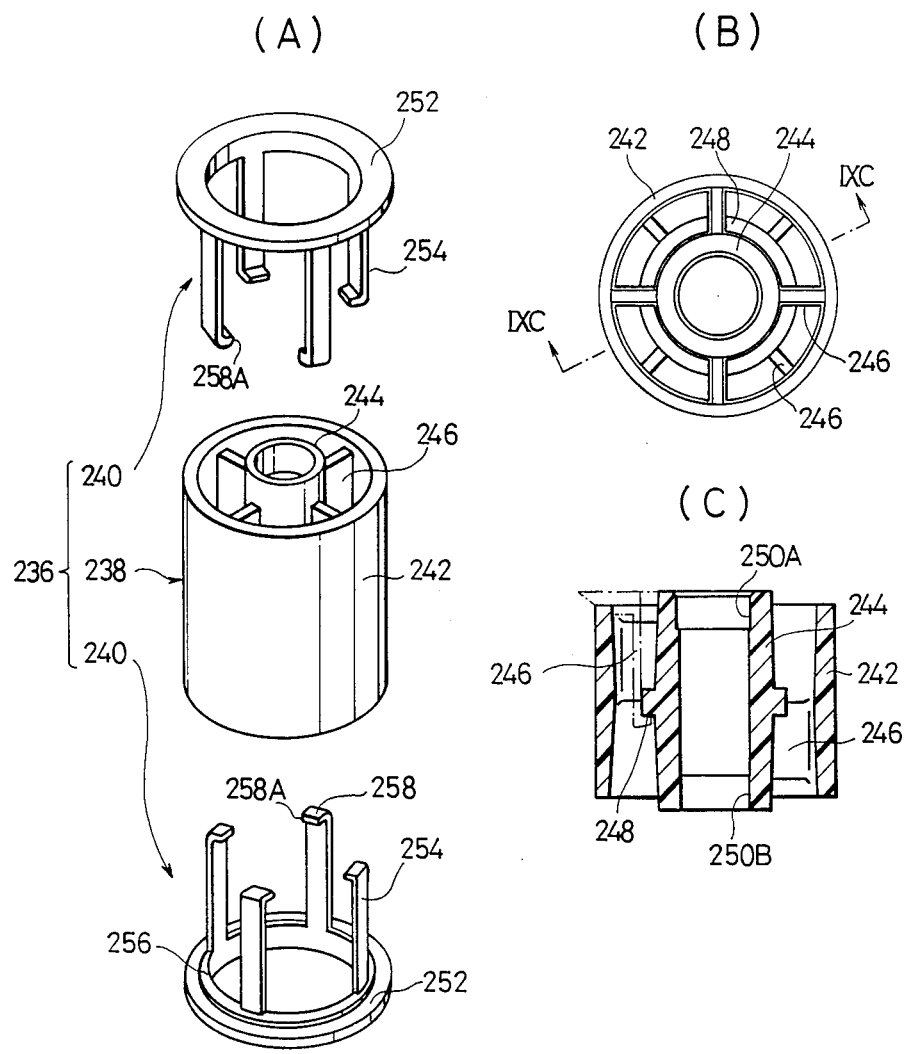

Guide Roller:

Referring to FIGS. 1 and 9, each of the guide rollers 236 is constituted by a hub member 238 and two flange members 240, which are assembled together in one unit. Each of the members 238 and 240 is integrally molded from a synthetic resin. The hub member 238 is composed of an outer tube 242 and an inner tube 244 which are connected together by ribs 246 in one unit. The inner tube 244 is made longer than the outer tube 242 so that both end portions of the inner tube 244 slightly project from the corresponding ends of the outer tube 242. A larger-diameter portion 248 is formed around the outer periphery of the central portion of the inner tube 244. The larger-diameter portion 248 projects in the form of a step beyond the outer peripheral surfaces of the other portions. The inside diameter of one end portion of the hollow portion of the inner tube 244 is made slightly larger than that of the intermediate portion, thereby providing a larger-diameter portion 250A, while the inside diameter of the other end portion is made slightly smaller than that of the intermediate portion so as to provide a smaller-diameter portion 250B.

The inner tube 244 and the outer tube 242 are connected by a total of eight ribs 246 which are disposed radially at equal spacings. On one side of the larger-diameter portion 248 of the inner tube 244, four ribs 246 are disposed at equal spacings of 90°; on the other side, four ribs 246 are disposed at equal spacing of 90° and 45° out of phase with respect to the former ribs 246.

Each of the flange members 240 is constituted by an integral structure which is composed of a disk-shaped flange portion 252 having an opening in its center, and four leg portions 254 projecting from the flange portion 252 at equal spacings. An annular protuberance 256 is formed along the periphery of the opening of the flange portion 252 so as to project therefrom in the form of a step. The leg portions 254 project from the protuberance 256, and the inner side surface of each leg portion 254 is contiguous with the end face of the opening of the flange portion 252. The distal end portion of each leg portion 254 is bent inwardly so as to provide a hook-shaped retaining portion 258. The undersurface of each retaining portion 258 is chamfered toward its inner surface, thereby providing a slanted surface 258A.

The hub member 238 and the flange members 240 are assembled together as follows.

The leg portions 254 of one of the flange members 240 are inserted into the gap between the outer and inner tubes 242 and 244 of the hub member 238, and each flange portion 252 is pressed toward the hub member 238. In consequence, the respective retaining portions 258 of the leg portions 254 are pressed so as to abut against the larger-diameter portion 248 formed on the inner tube 244, and the leg portions 254 then advance toward the inner side while having the slanted surfaces 258A on the retaining portions 258 guided by the larger-diameter portion 248.

Since the leg portions 254 are deflected outwardly, the retaining portions 258 pass the larger-diameter portion 248. At the same time as the retaining portions 258 have ridden over the portion 248, the shape of the leg portions 254 are restored, whereby the retaining portions 258 are retained by the rising surface of the larger-diameter portion 248. In this state, the flange portion 252 is in contact with the corresponding end face of the outer tube 242, and the outer peripheral surface of the annular protuberance 256 formed on the flange portion 252 abuts against the inner peripheral surface of the outer tube 242. The other flange member 240 is mounted on the hub member 238 from the side opposite to the above-described flange member 240 in a manner similar to the above. It is to be noted that the leg portions 254 of this flange member 254 are disposed such as to be 45° out of phase with respect to the leg portions 254 of the flange member 240 which has already been mounted.

The thus assembled guide rollers 236 are respectively accommodated in the left and right guide roller chambers 34 and 36 of the lower cassette casing 10, as shown in FIG. 7. In this case, roller shafts 260 (see FIG. 1) are respectively fitted on the projections 52 formed in the left and right guide roller chambers 34 and 36 in advance.

Each of the roller shafts 260 is a metallic tubular member and has a larger-diameter portion 260A formed on the outer periphery of one end portion, the portion 260A having a diameter slightly larger than that of the other portion, as shown in FIG. 1. The roller shafts 260 are respectively fitted on the projections 52, with the larger-diameter portions 260A directed downward. The guide rollers 236 are respectively fitted on the roller shafts 260 in such a manner that the larger-diameter portion 250A of the hollow portion of the inner tube 244 of the hub member 238 of each guide roller 236 is directed downward. Each guide roller 236 is supported in such a manner that the lower end face of the inner tube 244 abuts against the flange portion 52A formed around the root portion of the projection 52, and the larger-diameter portion 250A of the inner tube 244 is rotatably supported by the larger-diameter portion 260A of the roller shaft 260, and further, the smaller-diameter portion 250B of the inner tube 244 is rotatably supported by the upper portion of the roller shaft 260.

Figure 17:
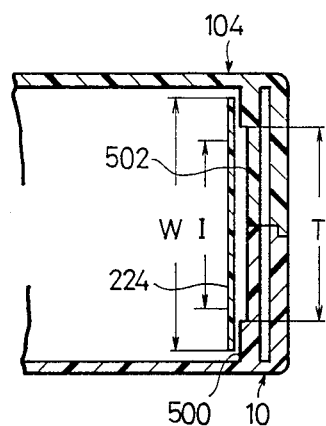
FIG. 17 is an enlarged sectional view taken along the line XVII—XVII of FIG. 2.

Inner Wall of Cassette Casing:

Referring to FIGS. 1 and 17, a groove 502 is defined by respective inner walls 500 of the lower and upper cassette casings 10 and 104.

The width T of the groove 502 is set such as to be smaller than the width W of the electrophotographic film 224 but larger than the width I of an image recorded on the film 224 (the dimension of the image in the lateral direction of the film 224). The groove 502 is, as shown in FIG. 2, provided at two positions along the inner walls 500, i.e., from the point A to the point B, and from the point C to the point D.

Figure 18:
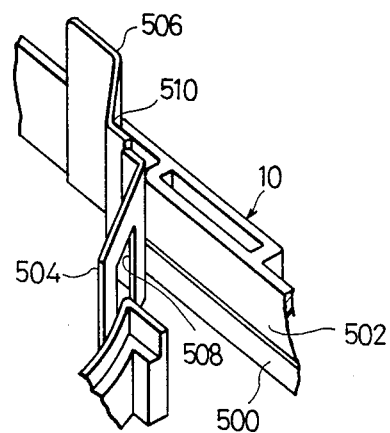
FIG. 18 is a fragmentary enlarged perspective view of pads serving as pressing members and peripheral portions thereof.

Pressing Member:

As shown in FIGS. 1 and 18, pads 504 and 506 which serve as pressing members are respectively bonded to the partition wall 54 and the inner wall 500. The pads 504 and 506 are constituted by a material which does not damage the tape 222, e.g., film of ultra-high-molecular-weight polyethylene. The pads 504 and 506 are respectively provided with bores 508 and 510 so that each of the pads 504 and 506 has an appropriate resilient force. The respective distal end portions of the pads 504 and 506 are bent, and the surfaces of the bent portions are brought into pressure contact with both surfaces, respectively, of the tape 222.

It should be noted that the pad 504 may be provided according to need and may be omitted.

Figure 10:
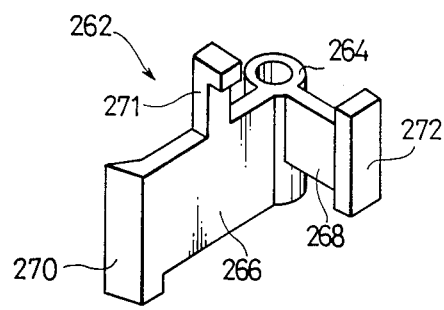
Figure 11:
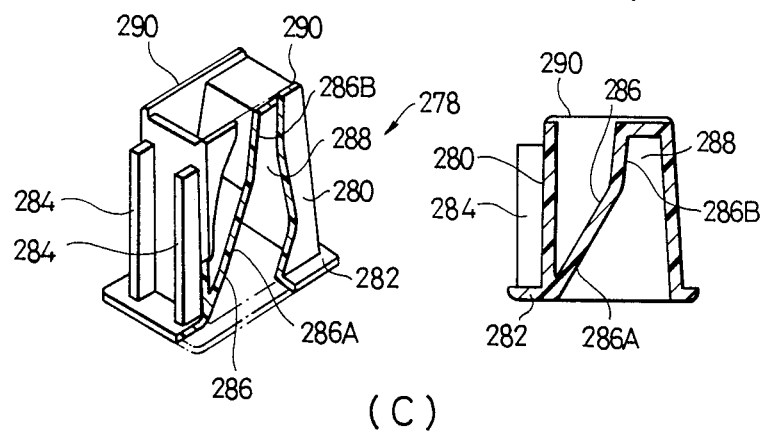

Brake Lever:

As shown in FIGS. 1 and 10, the brake lever 262 is composed of a cylindrical base portion 264, a reel engaging portion 266 projecting from the outer peripheral surface of the base portion 264, and a release piece engaging portion 268 projecting from the outer peripheral surface of the base portion 264, the portion 268 being 90° apart from the reel engaging portion 266, and these portions 264, 266 and 268 being integrally molded from a synthetic resin. The reel engaging portion 266 has the same heightwise dimension as that of the base portion 264, so that the former extends from the latter in such a manner that the upper and lower ends of the former respectively coincide with those of the latter. A pawl 270 is formed at the distal end of the reel engaging portion 266, the pawl 270 being bent toward the side of the portion 266 which is remote from the release piece engaging portion 268, and the pawl 270 further slightly extending downward. A spring retainer 271 projects upwardly from the intermediate portion of the upper end surface of the reel engaging portion 266, the retainer 271 having its distal end being bent so as to extend in the same direction as the release piece engaging portion 266 projects.

The release piece engaging portion 268 projects from the base portion 264 by an amount smaller than that of the reel engaging portion 266 and has a heightwise dimension smaller than that of the base portion 264. The portion 268 projects from the base portion 264 in such a manner that the upper end of the former coincides with that of the latter. A release piece abutting portion 272 is formed at the distal end of the release piece engaging portion 268, the portion 272 being bent so as to extend in the same direction as the reel engaging portion 266 projects and further slightly extending upwardly.

The other brake lever 274 has a symmetrical configuration with respect to that of the brake lever 262.

As shown in FIG. 7, the brake levers 262 and 274 are respectively accommodated in the left and right brake lever chambers 64 in such a manner that the projections 68 formed in the chambers 64 are fitted into the hollow portions of the base portions 264, respectively. After the brake levers 262 and 247 have been thus fitted, the coil portions of torsion coil springs 276 (see FIG. 1) are fitted on the projections 68, respectively. One arm of each of the springs 276 is retained by a projection 70 formed in each of the left and right brake lever chambers 64, and the other arm is retained by the spring retainer 271.

The brake levers 262 and 274 are biased by the respective torsion coil springs 276 so that the lever 262 pivots clockwise as viewed in FIG. 7 while the lever 274 pivots counterclockwise. The reel engaging portion 266 of the brake levers 262 and 274 extend into the left and right reel chambers 30 and 32 through the openings formed in the partition walls 74 which partition the left and right brake lever chambers 64 from the left and right reel chambers 30 and 32, respectively. The pawl 270 formed at the distal end of each reel engaging portion 266 is positioned between a pair of adjacent teeth 186 formed around the outer periphery of the flange 182 of each reel 180.

On the other hand, the release piece engaging portions 286 extend into the release piece accommodating chamber 62 through the notches 72 formed in the partition walls 60 which partition the left and right brake lever chambers 64 from the release piece accommodating chamber 62.

It is to be noted that since the lower end surface of the base portion 264 of each of the brake levers 262 and 274 abuts against and is supported by the flange portion 68A formed at the root portion of each of the projections 68, the reel engaging portions 266 cannot come in slide contact with the bottom panel 12 of the lower cassette casing 10. Further, since the pawls 270 which have portions extending downwardly from the reel engaging portions 266 are respectively positioned in the recesses 76 formed in the bottom panel 12 and, in addition, the flange portions 68 are provided, there is no risk of the pawls 270 coming in slide contact with the bottom panel 12.

Release Piece:

Referring to FIG. 1, together with FIG. 11(A) and 11(B), a release piece 278 which serves as a brake canceling member consists of a body portion 280 having a substantially parallelepiped configuration, a rectangular flange portion 282 projecting horizontally from the bottom of the base portion 280, and brake lever abutting portions 284, these portions being integrally molded from a synthetic resin. The brake lever abutting portions 284 respectively project from the left and right end portions of the rear wall of the body portion 280, and the respective lower ends of the portions 284 are integrated with the flange portion 282.

The body portion 280 is made hollow and has a partition wall 286 which divides the hollow inside into two portions, that is, front and rear portions. The partition wall 286 has a slanted portion 286A which rises at an angle of about 60° from the rear end face of the opening at the lower side of the body portion 280. The slanted portion 286A is bent at its intermediate portion such as to extend upwardly, thus providing a slanted portion 286B which is connected to one end of the upper wall of the body portion 280, the other end of the upper wall being contiguous with the front wall. The front wall is slanted so that the distance between the front and rear walls gradually increases toward the bottom of the release piece 278. A recess 288 is defined between the front wall and the slanted portion 286B of the partition wall 286. It is to be noted that the left and right side walls of the body portion 280 project beyond the upper wall, and the projecting portions respectively define slide contact portions 290 for slide contact with the upper cassette casing 10.

When the release piece 278 is accommodated in the release piece accommodating chamber 62, the undersurface of the flange portion 282 abuts against the bottom panel 12 of the lower cassette casing 10, and the brake lever abutting portions 284 respectively face the release piece abutting portions 272 formed at the distal end of the release piece engaging portions 268 of the brake levers 262 and 274. The slanted portion 286A is positioned above the through-hole 66 formed in the center of the release piece chamber 62.

It is to be noted that the configuration of the release piece 278 is not necessarily limited to that exemplified in this embodiment and may, as a matter of course, be such as that shown in FIG. 11(C).

Lock Plate:

As shown in FIGS. 1 and 12, a lock plate 292 which serves as a means for locking the guard panel consists of a cylindrical base portion 294, a guard panel engaging portion 296 extending from a position on the outer periphery of the base portion 294, and a leaf spring portion 298 extending from a position on the outer periphery of the base portion 294 such as to project in a direction opposite to that of the guard panel retaining portion 296, these constituent portions being integrally molded from a synthetic resin. The lower end of the guard panel engaging portion 296 is located slighly above the lower end of the base portion 294, and the upper end of the portion 296 is located at the level of the vicinity of the longitudinal center of the base portion 294. A retaining block 300 projects sidewardly from the lower portion at the distal end of the guard panel retaining portion 296, and a retaining canceling block 302 projects from the upper portion in the center of the portion 296 in the same direction as the block 300 does.

The leaf spring portion 298 is relatively thin and has a relatively short length in terms of the heightwise direction of the base portion 294. The portion 298 is bent at its intermediate portion such as to extend in the same direction as the block 300 projects. The lower end surface of the leaf spring portion 298 is positioned slightly above the lower end of the portion 294.

The lock plate 292 is, as shown in FIG. 7, accommodated in the lock plate chamber 40 in such a manner that the projection 83 formed in the chamber 40 is fitted into the hollow portion of the base portion 294. The distal end of the leaf spring portion 298 of the lock plate 292 resiliently abuts against the inner side of the left side wall 16, so that the guard panel retaining portion 296 is biased such as to pivot clockwise as viewed in FIG. 7. The portion 296 thus biased is pressed so as to abut against the lock plate retaining wall 84, and the distal end of the retaining block 300 projects from the opening 90, while the distal end of the retaining canceling block 302 projects from the notch 92.

Reel Retainer:

As shown in FIG. 1, a reel retainer 304 is constituted by a leaf spring formed from a single metallic flat sheet by bending and shearing. The retainer 304 has three bores 306 provided in its proximal-side portion and a substantially triangular opening 308 provided in its free end-side portion. The distal end of the free end-side portion of the retainer 304 has a circular configuration.

The arrangement of the other reel retainer 310 is similar to that of the retainer 304. The configuration of the free end-side portion of the retainer 310 is the same as that of the retainer 304, but the proximal-side portion of the retainer 310 is extended so that the retainer 310 has a substantially V-shaped configuration as a whole. Three bores 312 and two bores 314 are provided in the proximal-side portion of the retainer 310.

Each of the two contact members 316, which serve as external contacts, consists of an upper columnar portion having a spherical upper surface and a relatively large diameter, and a lower columnar portion having a relatively small diameter, the columnar portions being integrally molded. The two contact members 316 have their lower columnar portions respectively inserted into the bores 314 formed in the reel retainer 310. Then, the lower ends of the lower columnar portions are caulked, whereby the contact members 316 are secured to the reel retainer 310.

The reel retainer 304 and the reel retainer 310 which has the two contact members 316 secured thereto are respectively secured to the left and right reel chambers 128 and 130 of the upper cassette casing 104. The reel retainer 304 is secured to the top panel 106 in such a manner that the three projections 146 formed in the left reel chamber 128 are respectively fitted into the three bores 306 of the retainer 304, and the distal ends of the projections 146 are caulked by heating. Similarly, the reel retainer 310 is secured to the portion of the top panel 106 within the right reel chamber 130. The two contact members 316 are respectively fitted into the two through-holes 148 formed in the top panel 106 such that the spherical upper end surfaces of the contact members 316 slightly project from the outer surface of the top panel 106.

Electrically Conductive Grease:

An electrically conductive grease 612 is interposed in the area of contact between the reel retainer 310 and the contact piece 212. The grease 612 is shown disposed on the protuberant surface postion 214 of the contact piece 212, in FIG. 4(A) only for the sake of clarity. This electrically conductive grease is prepared by mixing grease with an electrically conductive material, e.g., a metallic powder containing copper, lead, graphite, etc. Grease is, for example, mixed with 10 wt % of copper, 20 wt % of lead, and 7 wt % of graphite. For example, MOLYPASTE AS (trade name) manufactured by SUMICO is preferable as the electrically conductive grease. It is only necessary to apply the electrically conductive grease to the hemispheric convex portion 216 of the protuberant surface 214 of the contact piece 212 shown, for example, in FIG. 4(A) and the periphery of the convex portion 216.

It should be noted that an ordinary grease is interposed in the area of contact between the other reel retainer 304 and the other contact piece 212.

Connection of Upper and Lower Cassette Casings:

The lower and upper cassette casings 10 and 104 are connected together in such a manner that the upper cassette casing 104 with the inner surface of the top panel 106 directed downward is overlaid on the lower cassette casing 10 with the inner surface of the bottom panel 12 directed upward. As described above, the corresponding side surfaces of the projecting portions formed on the peripheral walls and the like of the cassette casings 10 and 104 contact each other, and the top surface of one of each pair of mating projecting portions contacts the surface from which the other projecting portion rises, whereby both the cassette casings 10 and 104 are connected together by means of spigot joint.

The cylindrical projections 150 formed on the upper cassette casing 104 are respectively fitted into the hollow portions of the roller shafts 260 to thereby support the roller shafts 260 in cooperation with the cylindrical projections 52 formed on the lower cassette casing 10. The hollow portions of the cylindrical projections 168 formed on the upper cassette casing 104 respectively receive the columnar projections 68 formed on the lower cassette casing 10, whereby the columnar projections 68 are supported at both ends thereof. The hollow portion of the cylindrical projection 170 formed on the upper cassette casing 104 receives the columnar projection 83 formed on the lower cassete casing 10, whereby the projection 83 is supported at both ends thereof. The cylindrical projections 172 formed on the upper cassette casing 104 are respectively fitted into the hollow portions of the cylindrical projections 98 formed on the lower cassette casing 10.

Tapping screws 318 are respectively inserted into the hollow portions of the cylindrical projections 52 and 98 through the openings in the bottom panel 12 from the outer side thereof. The tapping screws 318 are in thread engagement with the projections on the upper cassette casing 104 which are respectively fitted to those on the lower cassette casing 10. It is to be noted that the head of each of the tapping screws 318 does not project from the outer surface of the bottom panel 12. In this way, the lower and upper cassette casings 10 and 104 are secured together in one unit, thus constituting a cassette casing body 320 such as that shown in FIG. 13.

Figure 14:
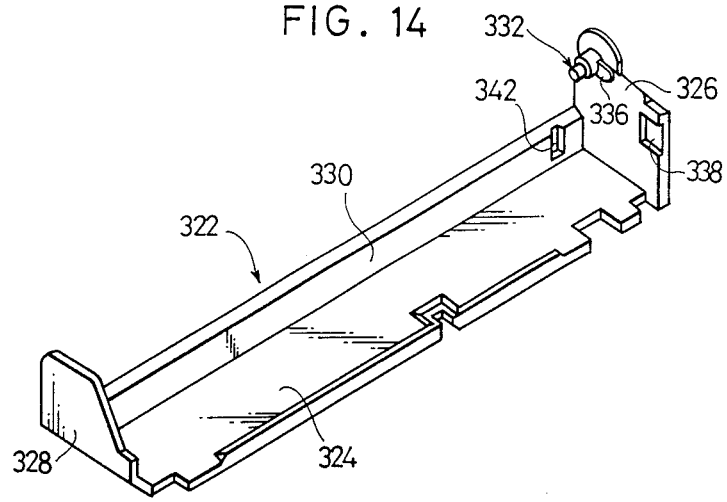

Guard Panel:

Referring to FIG. 1, together with FIGS. 13 and 14, a guard panel 322, which serves as a cover for the cassette casing body 320, consists of a front wall 324, left and right side walls 326, 328, and an upper wall 330. Projections 332 and 334 are respectively formed on the inner surfaces of the side walls 326 and 328 and at the upper portions on the rear side thereof, the projections 332 and 334 extending parallel to the front wall 324. The projection 332 formed on the left side wall 326 has a relatively large diameter at its root-side portion and a relatively small diameter at its distal end portion. A projection 336 is formed on the larger-diameter portion such as to project radially of the projection 332. The diameter of the projection 334 formed on the right side wall 328 is the same as that of the smaller-diameter portion of the projection 332, and the longitudinal length of the projection 334 is substantially equal to that of the smaller-diameter portion.

A recess 338 is formed in the lower portion at the rear end of the inner surface of the left side wall 326, one end of the recess 338 being exposed at the undersurface of the wall 326. Two ridges are formed on the right end portion of the outer surface of the upper wall 330, the ridges constituting a pair of guide rails 340 which are to be connected in series to the substantially U-shaped guide rails 176 constituted by the ridges formed on the outer surface of the upper cassette casing 104. The degree by which th ridges (rails) 340 project from the outer surface is the same as that of the ridges (rails) 176. A recess 342 is formed in the left end portion of the inner surface of the upper wall 330, the recess 342 opening to the rear surface of the wall 330. Four notches 346A to 346D are formed in the lower portions of the front wall 324 and the wall portion at the joint between the front wall 324 and the right side wall 328.

Mounting of Guard Panel on Cassette Casing Body:

The guard panel 322 is mounted on the cassette casing body 320 after a torsion coil spring 344 has been disposed on the projection 332. The spring 344 has its coil portion fitted on the larger-diameter portion of the projection 332, one end thereof being retained by the projection 336, and the arm portion at the other end thereof being temporarily retained by the recess 342 formed in the upper wall 330. As described above, the cassette casing body 320 has the shaft supporting bores 120 and 126 formed at the joint portions between the lower and upper cassette casings 10 and 104. The projections 332 and 334 formed on the guard panel 322 are respectively fitted into the bores 120 and 126.

Figure 15:
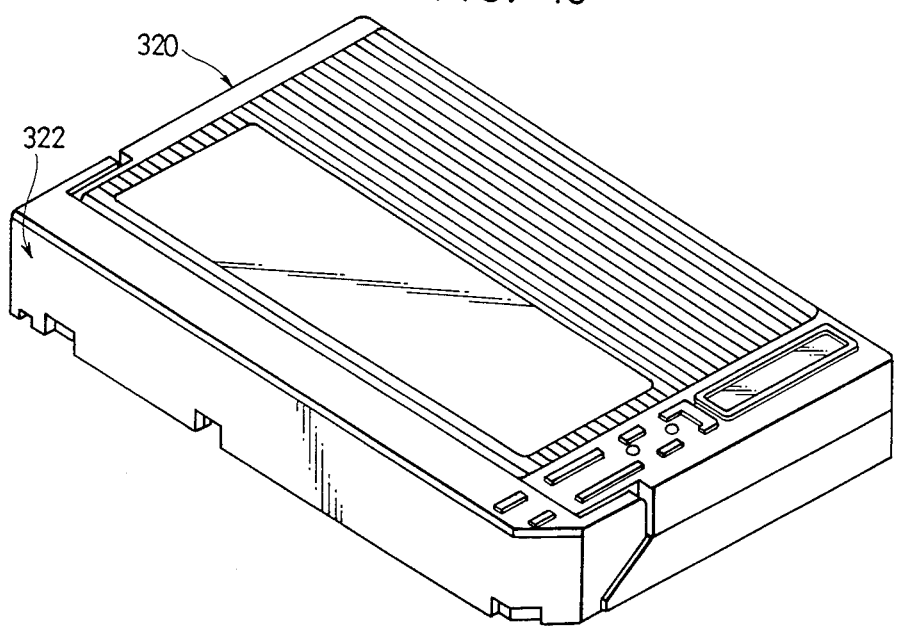

First, the projection 332 is fitted into the shaft supporting bore 120 formed in the left side wall of the cassette casing body 320. The projection 332 has its smaller-diameter portion at the distal end fitted into the shaft supporting bore 120 immediately after the position at which the arm portion of the torsion coil spring 344 is retained has been shifted from the recess 342 to the recess 173 of the upper cassette casing 104. Then, the projection 334 is fitted into the shaft supporting bore 126 formed in the right side wall of the cassette casing body 320. In this way, the guard panel 322 is mounted on the cassette casing body 320, thus completing the assembly of the cassette as shown in FIG. 15. In this assembled state, the guard panel 322 is biased by the torsion coil spring 344 such as to pivot toward the lower side as viewed from the front of the cassette.

Figure 16:
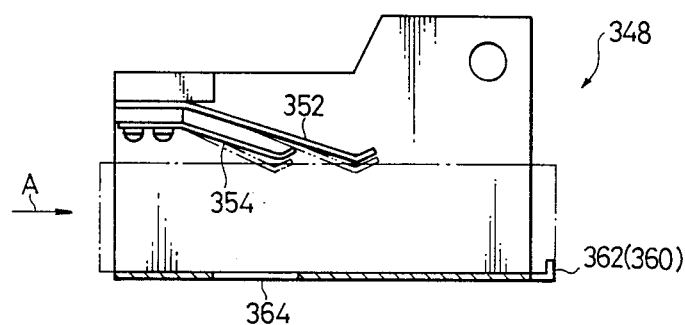
FIG. 16(A) is a perspective view which schematically shows the cassette holder section of an apparatus into which the cassette in accordance with the embodiment of the present invention is loaded.
FIG. 16(B) is a sectional view of the cassette holder section shown in FIG. 16(A)

Apparatus into Which Cassette is Loaded:

FIG. 16 schematically shows a cassette holder 348 of an apparatus into which the cassette in accordance with this embodiment is loaded. The apparatus is constituted so as to record the image on the frame of the film and/or project the image. The cassette holder 348 is supported by a link-type lifting mechanism 350 so that the holder 348 is movable toward the upper side of the apparatus. Two contacts 352 and 354 which are respectively constituted by leaf springs are disposed on the cassette holder 348 in parallel with the direction (indicated by the arrow A in FIG. 16) in which the cassette is inserted into the apparatus, the contact springs 352 and 354 extending downwardly toward the inner side in the cassette inserting direction and being insulated from each other. Each of the contact springs 352 and 354 is bent at its distal end portion so that the distal end is directed upward. The contact spring 352 is grounded.

A pressing block 356 is disposed at an opening provided in one of the sides of the cassette holder 348. The block 356 is secured to one end of a leaf spring 358 in such a manner that the distal end portion of the block 356 projects from the opening. Further, hook-shaped stoppers 360 and 362 are formed on the bottom of the cassette holder 348, and through-holes 364 which respectively correspond to the through-holes 46 of the lower cassette casing 10 are provided in the bottom of the holder 348.

Operation of the Embodiment:

The following is a description of the embodiment detailed above.

Since the electrically conductive grease is interposed in the area of contact between the reel retainer 310 and the contact piece 212, the surfaces of the contact portions are coated with the grease and therefore not contacted by oxygen in the atmosphere, so that oxidation of these surfaces is prevented.

Accordingly, there is no fear of any contact failure occurring between the contact portions during the rotation of the reel.

Further, the coating of the electrically conductive grease prevents the contact portions from becoming worn, and even if a very small amount of dust is generated due to wear of the contact portions, it is trapped by the grease, and scattering of the dust is thus prevented.

Accordingly, images recorded on the electrophotographic film are not damaged by the dust.

During the operation of winding the tape 222 forward or rewinding it, when the travel of the tape 222 is started, the tape traveling speed is accelerated, whereas, when the travel of the tape 222 is suspended, the tape traveling speed is decelerated. Even when the rotational speed of each reel 180 is constant, the tape traveling speed may fluctuate if the axes of rotation of the reels 180 and the guide rollers 236 are offset from their respective centers or if the roundness of the reels 180 and the guide rollers 236 is unsatisfactory.

In electrophotographic apparatuses, images are not necessarily recorded on a film consecutively and may be recorded at positions spaced apart from each other according to kinds of document. When recorded images are retrieved and projected, it may be necessary to project images recorded at positions spaced apart from each other in accordance with related materials which are desired to be retrieved. Therefore, the film is generally wound and rewound frequently.

When the tape traveling speed is acclerated or decelerated, the length by which the tape 222 is unwound from the reel 180 is undesirably varied due to inertia. In this embodiment, however, when the tape 222 is excessively unwound, the resilient forces of the pads 504 and 506 cause an increase in the angle at which the tape 222 is in contact with the guide roller 236, so that the contact of the tape 222 with the guide roller 236 is effectively maintained, and a portion of the tape 222 which is stretched between the guide rollers 236 is tensed.

Accordingly, there is no fear of the electrophotographic film 224 hitting the peripheral surfaces of the guide rollers 236 or the pressing plate of a processing head, and it is therefore possible to prevent the tape 222 from being damaged.

Since the flexural rigidly of the electrophotographic film 224 is greater than those of the magnetic tape 226 and the leader tape 228, when the film 224 is excessively unwound from the reel 180 at the time of acceleration or deceleration during the travel of the film 224, the tape 222 may slide while contacting the inner walls 500 of the lower and upper cassette casings 10 and 104. However, in this embodiment the grooves 502 are formed in the inner walls 500, and there is therefore no fear of images recorded on the film 224 coming in slide contact with the inner walls 500.

Thus, any damage to the recorded images is prevented.

When the cassette is out of use, for example, when it is stored or transported, it has an external appearance such as that shown in FIG. 15. More specifically, as shown in FIG. 13(A) a portion of the tape 222, which is led out from one tape inlet/outlet port 158 and guided into the other tape inlet/outlet port 158, is exposed at the front side of the cassette casing body 320 constituted by the lower and upper cassette casings 10 and 104 rigidly connected together. The exposed portion of the tape 222 is positioned on the rear side of the guard panel 322, since the panel 322 is in its closed position and covers the front side of the cassette casing body 320. Thus, the guard panel 322 covers the exposed portion of the tape 222 so as to prevent this portion from contacting any foreign matter, as well as covering the tape inlet/outlet ports 158. Accordingly, the ports 158 are shielded from light in a relatively satisfactory manner.

When the cassette is out of use, the greater part of the tape 222 has been rewound so as to be set on one of the reels 180 (the right-hand reel, in this embodiment), and the leader tape 228 and the magnetic tape 226 are positioned on the outer peripheral side of the roll of the tape 222 wound on the reel 180. For this reason, no light practically enters through the tape inlet/outlet ports 158, and even if a slight amount of light enters, there is no risk of the electrophotographic film 224 on the inner peripheral side of the tape roll being affected by the light.

The guard panel 322, which is in its closed position and covers the front side of the cassette casing body 320, is maintained in this position by the action of the torsion coil spring 344 biasing the panel 322. In addition, the guard panel 322 is locked by the lock plate 292 in order to prevent the panel 322 from being undesirably opened against the biasing force of the spring 344. The lock plate 292 is biased by the leaf spring portion 298 such that the distal end of the retaining block 300 of the guard panel retaining portion 296 projects from the opening 90 so as to engage with the recess 338 formed in the inner surface of the left side wall 326 of the guard panel 322 in order to prevent the panel 322 from pivoting to open. It is to be noted that the distal end of the retaining canceling block 302 of the guard panel retaining portion 296 projects from the notch 92 and is exposed to the outside of the cassette casing body 320.

As to the reels 180, the convex portions 216 of the contact pieces 212 integrated with the reels 180 are biased by the respective reel retainers 304 and 310, respectively, whereby the reels 180 are pressed against the bottom panel 12 of the lower cassette casing 10. The reels 180 respectively close the through-holes 46 provided in the bottom panel 12, and the triple partition wall consisting of the annular protuberances 48, 196 and 50 isolates the interior of the cassette casing body 320 from the outside. Therefore, even if the reels 180 are undesirably lifted, intrusion of dust and light is practically prevented.

The brake levers 262 and 274 are respectively biased by the torsion coil springs 276 so as to pivot, and each cf the pawls 270 is positioned between one pair of adjacent teeth 186 formed along the outer periphery of the flange 182 of the corresponding reel 180. Accordingly, the reels 180 are locked from turning, and the tape 222 is thereby prevented from being unwound loosely. The release piece 278 is positioned above the through-hole 66 formed in the bottom panel 12 of the lower cassette casing 10 so as to close the through-hole 66, thereby preventing intrusion of dust and light through the through-hole 66.

In actual use, the cassette is loaded into the apparatus. As shown in FIG. 16, the cassette holder 348 which is disposed in the apparatus is moved toward the upper side of the apparatus by means of the lifting mechanism 350 in response to the actuation of an ejector button (not shown). The cassette is inserted into the cassette holder 348 in the direction of the arrow A shown in FIG. 16, with the guard panel 322 directed toward the holder 348. When the leading end of the cassette reaches the approximately central portion of the cassette holder 348, the cassette contacts the contact spring 354. The bent distal end portion of the contact spring 354 first abuts against and rides on one of the two ridges 340 formed on the guard panel 322, and immediately thereafter, the distal end portion abuts against and rides on the other ridge 340. Before abutting against the guard panel 322, the contact spring 354 is placed in the position shown by the chain line in FIG. 16(B), and after the abutment, the contact spring 354 is elastically deformed as shown by the solid line in FIG. 16(B).

As the cassette is further inserted, the contact spring 354 transfers from the ridges 340 to the two ridges 176 formed on the upper cassette casing 104. Similarly, the other contact spring 352 first rides on the ridges 340 and then transfers to the ridges 176. When the cassette reaches a point which defines the innermost position of its travel, portions of the front wall of the lower cassette casing 10 which respectively face the notches 346B and 346D formed in the guard panel 322 abut against the respective stoppers 360 and 362 formed on the cassette holder 348.

In the above state, the bent distal end portions of the contact springs 352 and 354 are positioned within the recesses 178 defined at the intermediate portions of the ridges 176 and are resilient contact with the contact members 316, respectively, which are positioned between the right- and left-hand recesses 178 as viewed in the cassette inserting direction. Further, when the cassette reaches the innermost position of its travel, the pressing block 356 presses against the retaining canceling block 302 of the lock plate 292, thus causing the guard panel retaining portion 296 to pivot against the biasing force applied thereto from the leaf spring 298. In consequence, the retaining block 300 is withdrawn into the opening 90, and the guard ponel 322 is thereby unlocked. It is to be noted that before the cassette reaches said position, the pressing block 356 is pressed by the left side wall of the cassette casing body 320 so that the leaf spring 358 is deflected, and the block 356 is thereby withdrawn into the opening.

When the insertion of the cassette into the cassette holder 348 has been completed, the cassette holder 348 is manually or automatically pushed into a predetermined position within the apparatus. During this operation, the notch 346A formed in the guard panel 322 engages with a cover opening mechanism (not shown) which is disposed in the apparatus, thus causing the guard panel 322 to be gradually opened against the biasing force of the torsion coil spring 344. When the cassette holder 348 reaches a point which defines the innermost position of its travel, the guard panel 322 is completely opened.

During the operation of pushing the cassette holder 348, when the holder 348 comes near said innermost position, a brake canceling pin (not shown) which is disposed in the apparatus enters the through-hole 66 provided in the bottom panel 12 of the lower cassette casing 10 and gradually advances toward the inner side as the pushing operation progresses. In this state, the release piece 278 is positioned above the through-hole 66. The brake canceling pin abuts against the slanted portion 286A of the release piece 278 and presses the latter. However, since the slide contact portions 290 of the release piece 278 respectively abut against the guide walls 162 formed on the upper cassette casing 104, the release piece 278 thus pressed is prevented from moving upward.

Accordingly, the release piece 278 is moved while slide-contacting the guide walls 162 by means of the horizontal component of the pressing force applied thereto from the brake canceling pin. During this movement, the release piece 278 is prevented from moving laterally by the projecting piece 166 of the guide walls 164. When the cassette holder 348 is placed at the innermost position of its travel, the brake canceling pin is positioned within the recess 288 formed in the inner side of the release piece 278. Since the release piece 278 is moved in a state wherein the through-hole 66 is closed, intrusion of dust and light through the through-hole 66 is prevented during the movement of the release piece 278.

In response to the movement of the release piece 278, the release piece abutting portions 272 of the brake levers 262 and 274 are respectively pressed by the brake lever abutting portions 284 of the release piece 278, and the brake levers 262 and 274 are thereby pivoted against the biasing forces of the torsion coil springs 276, thus causing the pawls 270 to withdraw from the reels 180. Thus, the reels 180 are released from the brakes and allowed to turn.

When the cassette holder 348 is placed at the innermost position of its travel, the reels 180 are, as shown in FIG. 8, mounted on respective reel tables 376 which are disposed in the apparatus, and the shafts 378 of the reel tables 376 are positioned within the hollow portions of the inner tubes 188, respectively, each shaft 378 having a plurality of engagement pieces 380 projecting radially therefrom, and each engagement piece 380 being positioned between each pair of adjacent projections 200. It is to be noted that the reels 180, in this state, are not pushed upwardly by the respective reel tables 376.

The cassette holder 348, at the innermost position of its travel, is locked by a lock mechanism (not shown) which is provided in the apparatus so that the holder 348 is maintained in this position.

In the cassette, one of the reels 180 is turned by rotating the corresponding reel tables 376, while the other reel 180 is turned by means of the traction applied thereto through the tape 222. The electrically conductive layer of the electrophotographic film 224 is electrically connected to the contact piece 212 disposed on the first reel 180 through the electrically conductive adhesive tape 232. The contact piece 212 is electrically connected to the reel retainer 310 at the convex portion 216, while the reel retainer 310 is electrically connected to the contact springs 352 and 354 disposed on the apparatus through the contact members 316 so that the retainer 310 is grounded to the apparatus. Accordingly, the electrophotographic film 224 is constantly grounded regardless of whether the reels 180 are turned or at rest.

After the use of the cassette, it is unloaded from the apparatus and stored. In this case, the ejector button (not shown) which is provided on the apparatus is actuated, and the cassette holder 348 is thereby moved toward the upper side of the apparatus. In this state, the guard panel 322 is disengaged from the cover opening mechanism (not shown) and therefore brought into its closed position by means of the biasing force applied thereto from the torsion coil spring 344. Since the release piece 278 is disengaged from the brake canceling pin (not shown), the brake levers 262 and 274 are pivoted by means of the biasing forces of the torsion coil springs 276, respectively. In consequence, the brake lever abutting portions 285 of the release piece 278 are respectively pressed by the release piece abutting portions 272 of the brake levers 262 and 274, thus causing the release piece 278 to slide so as to reach its previous position. At the same time, each of the pawls 270 of the brake levers 262 and 274 is positioned between one pair of adjacent teeth 186 formed along the outer periphery of the flange 182 of the corresponding reel 180, thereby preventing the reels 180 from turning.

Then, the cassette is drawn out of the cassette holder 348 and stored. In response to the operation of drawing out the cassette, the retaining canceling block 302 of the lock plate 292 is released from the pressure applied thereto from the pressing block 358. In consequence, the guard panel retaining portion 296 is pivoted by means of the biasing force of the leaf spring portion 298. As the guard panel retaining portion 296 pivots, the retaining block 300 projects from the opening 90 and engages with the recess 338 of the guard panel 322, thus locking the guard panel 322.

It should be noted that in the above embodiment the reels 180 respectively accommodated in the left and right reel chambers 30 and 32 have the same structure and are respectively provided with the contact pieces 212 so that the same kind of element can be used in common for the purpose of reducing the number of constituent elements. However, it is a matter of course that a reel having no grounding function may be accommodated in the left reel chamber.

In the above embodiment, the tape 224 is described as an electrophotographic film, but any film having an electrically conductive layer which requires grounding, i.e., an electrostatic film or a photoelectrophoretic (P.E.P.) film, can be applied to the present invention. That is to say, the present invention can be applied to any cassette which requires grounding for a film having an electrically conductive layer.

Also, the electrophotographic film applied to the present invention includes such a microfilm that an image is recorded thereon.

In the electrophotographic film accommodating cassette according to the present invention, an electrically conductive grease containing a metallic powder is interposed in the area of contact between the contact piece and the reel retainer. With such simple arrangement, the surfaces of the contact portions are coated with the grease and thereby prevented from being oxidized. Accordingly, it is possible to eliminate the fear of a contact failure occurring between the contact portions and thereby to prevent fogging of recorded images.

The coating of the electrically conductive grease also prevents the contact portions from becoming worn, and even if a very small amount of dust is generated due to wear of the contact portions, it is trapped by the grease and thereby prevented from scattering. Accordingly, there is no risk of images recorded on the electrophotographic film being damaged by the dust.

What is claimed is:

1. A cassette for accommodating a tape-shaped material having an electrically conductive layer, comprising:
    a cassette casing accommodating the tape-shaped material;
    a reel rotatably supported within said cassette casing for winding up said material;
    a contact piece disposed on one end face of said reel and electrically connected to an electrically conductive layer of said material;
    a reel retainer rigidly secured to said cassette casing and having a grounding contact, said reel retainer being in contact with said contact piece; and
    an electrically conductive grease interposed in the area of contact between said contact piece and said reel retainer.

2. A cassette according to claim 1, wherein said grease contains a metallic powder.

3. A cassette according to claim 2, wherein said metallic powder contains copper, lead and graphite.

4. A cassette for accommodating a tape-shaped film having an electrically conductive layer, comprising:
    a cassette casing accommodating the film;
    a reel rotatably supported within said cassette casing for winding up said film;
    a contact piece disposed on one end face of said reel and electrically connected to an electrically conductive layer of said film;
    a reel retainer rigidly secured to said cassette casing and having a grounding contact, said reel retainer being in contact with said contact piece; and
    an electrically conductive grease interposed in the area of contact between said contact piece and said reel retainer.

5. A cassette according to claim 4, wherein said grease contains a metallic powder.

6. A cassette according to claim 5, wherein said metallic powder contains copper, lead and graphite.

7. A cassette for accommodating an electrophotographic film, comprising:
    a cassette casing accommodating the electrophotographic film;
    a pair of take-up reels rotatably supported within said cassette casing for winding up said film;
    a contact piece secured to each of said pair of take-up reels in such a manner as to extend to one end face of said reel, said contact piece being electrically connected to an electrically conductive layer of said film;
    a pair of reel retainer springs rigidly secured to said cassette casing and brought into contact with said contact pieces, respectively, one of said reel retainer springs having a contact member projecting outward from said cassette casing; and
    an electrically conductive grease interposed in the area of contact between said one reel retainer spring and the contact piece which is in contact with it.

8. A cassette according to claim 7, wherein said grease contains a metallic powder.

9. A cassette according to claim 8, wherein said metallic powder contains copper, lead and graphite.

10. A cassette according to claim 7, wherein each of said contact pieces has a hemispheric convex portion which is in contact with the corresponding reel retainer spring, said grease being attached to said convex portion and its periphery.

* * * * *